(12) United States Patent
Walters et al.

(10) Patent No.: US 10,904,236 B1
(45) Date of Patent: Jan. 26, 2021

(54) METHODS AND SYSTEMS FOR IDENTIFYING AND AUTHORIZING A USER BASED ON A MINI-GAME LOGIN

(71) Applicant: Capital One Services, LLC, McLean, VA (US)

(72) Inventors: Austin Walters, Savoy, IL (US); Anh Truong, Champaign, IL (US); Vincent Pham, Champaign, IL (US); Reza Farivar, Champaign, IL (US); Mark Watson, Sedona, AZ (US); Jeremy Goodsitt, Champaign, IL (US); Fardin Abdi Taghi Abad, Seattle, WA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/676,794

(22) Filed: Nov. 7, 2019

(51) Int. Cl.
*H04L 29/06* (2006.01)
*G06F 21/36* (2013.01)
*A63F 13/30* (2014.01)
*H04W 12/06* (2009.01)

(52) U.S. Cl.
CPC .............. *H04L 63/08* (2013.01); *A63F 13/30* (2014.09); *G06F 21/36* (2013.01); *H04W 12/06* (2013.01)

(58) Field of Classification Search
CPC .......... H04L 63/08; A63F 13/30; A63F 13/73; A63F 13/79; A63F 13/12; A63F 13/71; A63F 2300/401; A63F 2300/8023; G06F 3/04817; G06F 3/04842; G06F 21/36; G06F 3/0488; G06F 21/31; G06F 2221/2103;

(Continued)

(56) References Cited

U.S. PATENT DOCUMENTS

| 6,104,815 | A | * | 8/2000 | Alcorn | ................... A63F 13/12 380/251 |
| 8,868,423 | B2 | | 10/2014 | Gross | |
| 9,547,766 | B2 | | 1/2017 | Turgeman et al. | |

(Continued)

OTHER PUBLICATIONS

Voris J. (2018) Measuring How We Play: Authenticating Users with Touchscreen Gameplay. In: Murao K., Ohmura R., Inoue S., Gotoh Y. (eds) Mobile Computing, Applications, and Services. MobiCASE 2018, pp. 144-164 (Year: 2018) (Year: 2018).*

*Primary Examiner* — Trang T Doan
(74) *Attorney, Agent, or Firm* — Bookoff McAndrews, PLLC

(57) ABSTRACT

A computer-implemented method is provided for verifying user authentication. An authentication server may receive from a network server device a login request that is associated with a user. The user may be assigned to a user category based on attributes of the user. An authentication game may be selected for the user based on the user category. The user may be assigned to a game play cluster for the selected authentication game. The authentication game may be sent to the network server device over a network for interaction with the user. A game result may be received from the network server device. Data representing the game play results may be compared with corresponding one or more cluster classifiers. Based on the comparing, the authentication server may determine whether the game play results match the expected game play results. When the game play results match the expected game play results, the login request may be approved.

20 Claims, 5 Drawing Sheets

(58) Field of Classification Search
CPC ..... G06F 2221/2141; G06F 2221/2109; G06F 2221/2129; H04W 12/06
See application file for complete search history.

(56) References Cited

U.S. PATENT DOCUMENTS

| | | | |
|---|---|---|---|
| 9,723,005 B1 | 8/2017 | McInemy et al. | |
| 10,049,202 B1* | 8/2018 | Johansson | G06F 3/04817 |
| 10,482,462 B1* | 11/2019 | Eidam | G06Q 20/1085 |
| 2013/0196734 A1* | 8/2013 | Cage | G07F 17/329 |
| | | | 463/17 |
| 2014/0096196 A1* | 4/2014 | O'Connor | G06F 21/36 |
| | | | 726/4 |
| 2014/0164476 A1* | 6/2014 | Thomson | G06Q 10/101 |
| | | | 709/203 |

\* cited by examiner

METHODS AND SYSTEMS FOR IDENTIFYING AND AUTHORIZING A USER BASED ON A MINI-GAME LOGIN

TECHNICAL FIELD

Various embodiments of the present disclosure relate generally to analyzing user authentication, and, more particularly, to verifying user login attempts.

BACKGROUND

Often, websites require users to log in to accounts to gain access to sensitive information. User accounts may be compromised by autonomous network programs (e.g., "bots") that may maliciously compromise user accounts via unauthorized, but successful, logins. Additionally, layers of security may be added to supplement login requirements on many websites. For example, Turing tests such as "completely automated public Turing tests to tell computers and humans apart" or "CAPTCHA" may be used to distinguish between human login attempts and login attempts by bots. Additionally, security questions may be added to user login requests to add a further layer of security. However, as bots increase in sophistication, these security layers may become easier for bots to break and/or circumvent.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for verifying user authentication. In one aspect, a method is provided that may comprise, at an authentication server device configured to communicate with a network server device over a network, receiving from the network server device a login request that is associated with a user; assigning the user to a user category based on attributes of the user; selecting an authentication game for the user based on the user category; assigning the user to a game play cluster for the selected authentication game, wherein the cluster has one or more cluster classifiers that each represent expected game play results for the authentication game; sending the authentication game to the network server device over the network for interaction with the user; receiving a game result from the network server device, wherein the game result includes data representing game play results from the interaction of the user with the authentication game; comparing the data representing the game play results with a corresponding one or more of the cluster classifiers; based on the comparing, determining whether the game play results match the expected game play results; and when the determining indicates that the game play results match the expected game play results, approving the login request for the user.

In another aspect, a method is provided that may comprise, at an authentication server device configured to communicate with a network server device over a network, receiving from the network server device a login request that is associated with a user; determining whether an authentication verification should be sent to the user based on previous login attempts by the user; when the determining does not indicate that the authentication verification should be sent to the user: approving the login request for the user and storing, in a database, information about the login request; and when the determining indicates that the authentication verification should be sent to the user: assigning the user to a user category based on attributes of the user; selecting an authentication game for the user based on the user category; assigning the user to a game play cluster for the selected authentication game, wherein the cluster has one or more cluster classifiers that each represent expected game play results for the authentication game; sending the authentication game to the network server device over the network for interaction with the user; receiving a game result from the network server device, wherein the game result includes data representing game play results from the interaction of the user with the authentication game; comparing the data representing the game play results with a corresponding one or more of the cluster classifiers; based on the comparing determining whether the game play results match the expected game play results; and when the determining indicates that the game play results match the expected game play results, approving the login request for the user.

In yet another aspect, a system is provided that may comprise a database configured to store user data; and an authentication server in communication with the database and with a network server device over a network, and further configured to: receive from the network server device a login request that is associated with a user; assign the user to a user category based on attributes of the user received from the database; select an authentication game for the user based on the user category; assign the user to a game play cluster for the selected authentication game, wherein the cluster has one or more cluster classifiers that each represent expected game play results for the authentication game; send the authentication game to the network server device over the network for interaction with the user; receive a game result from the network server device, wherein the game result includes data representing game play results from the interaction of the user with the authentication game; compare the data representing the game play results with a corresponding one or more of the cluster classifiers; based on the comparing, determine whether the game play results match the expected game play results; and upon determining that the game play results match the expected game play results, approve the login request for the user.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, authentication verification techniques, such as an authentication game, may be used to verify user login attempts.

Figure 1:
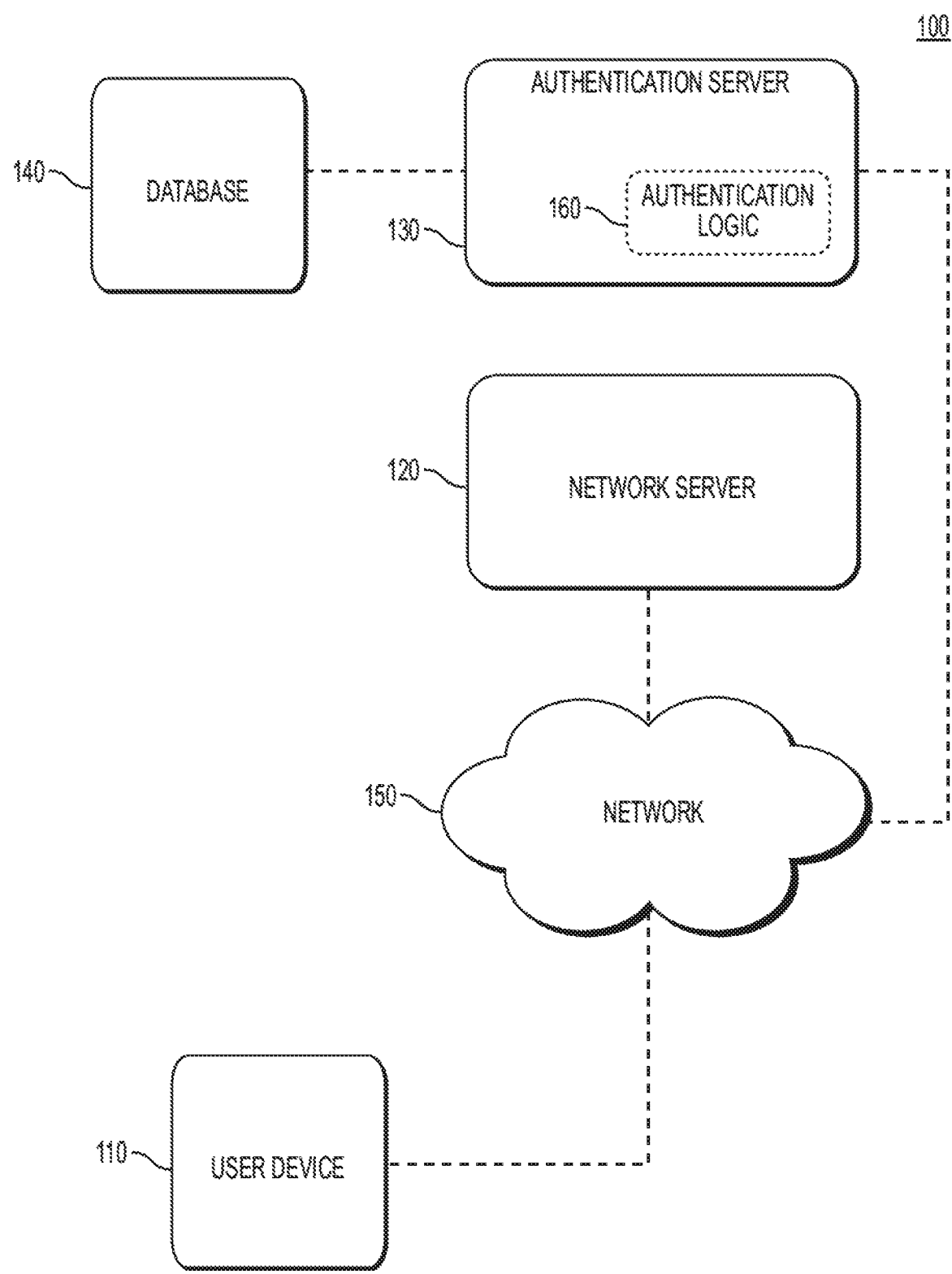
FIG. 1 depicts an example system infrastructure, according to one or more embodiments.

FIG. 1 is a diagram depicting an example of a system environment 100 according to one or more embodiments of the present disclosure. The system environment ("system") 100 may include a user device 110, a network server 120, an authentication server 130, and a database 140. The system 100 also includes a network 150. The user device 110, network server 120, and the authentication server 130 are configured to communicate with each other (e.g., send and receive data to each other) via the network 150. In one example, the network 150 may be a wide area network (WAN) such as the Internet.

The user device 110 may be operated by a user (not shown in FIG. 1) to access resources on the network server 120. For example, the network server 120 may be a webserver that hosts a website or a mobile application, and the user may attempt to access the website via a web browser on the user device 110 across the network 150. The user device 110 may be a computing device, such as a mobile device, laptop, desktop computer, tablet, or other network enabled device as will be described in connection with FIG. 5, below. It should be appreciated that though the techniques herein may describe a website and a web server, the techniques are applicable to any data configured to be served to the user device 110 (e.g., a mobile application or other content hosting software).

The network server 120 may be a computing device (e.g., a server) that is configured to host the website which the user is attempting to access. The network server 120, for example, may host a secure website that requires user authentication before a user can access the contents of the website. In one example, the network server 120 may host a financial website for a bank or other financial company/institution, and the user may attempt to access his or her account information on the website via the user device 110 by authenticating with the network server 120 to gain such access. The network server 120 may communicate with the authentication server 130 to verify appropriate authentication by a user, according to the techniques described herein.

The authentication server 130 may be a computing device (e.g., a server) that is configured to provide operations to verify user authentication, according to the techniques described herein. For example, the authentication server 130 may store in memory authentication logic 160 that, when executed by a processor of the authentication server 130, causes the processor to perform the user authentication verification techniques described herein. The authentication server 130 is configured to communicate with the database 140, for example, to store information related to user authentication and to retrieve information related to user authentication, as described by the techniques herein. In one example, the authentication server 130 may communicate with the database 140 via a network (e.g., network 150) or other communication link. In another example, the database 140 may be stored in memory on the authentication server 130 itself.

As stated above, in general, the techniques described herein are directed to verifying user authentication. As mentioned, a user may attempt to login to a secure website hosted by the network server 120 via the user device 110. For example, the user may provide a user name and a corresponding password via a web browser or software application (e.g., a mobile application) to the network server 120 to gain access to his or her account on the secure website. The user, however, may not be the only network entity attempting to gain access to the website. For example, third parties, such as other human attackers or malicious network programs, such as "bots," may attempt to gain unauthorized access to the user's account on the website. Third parties may employ several hacking techniques to replicate the user's login information (e.g., the user name and corresponding password) to gain unauthorized access to the user's account. For example, third parties may use brute force password-guessing methods to ultimately arrive at the user's correct password.

Thus, the authentication techniques provided by a network server 120 alone may not be sufficient to protect against malicious attacks by third parties. In order to prevent and/or combat such attacks, the network server 120 may enlist the authentication server 130 to provide additional layers of security to verify user authentication. For example, as described by the techniques herein, the authentication server 130 may receive information about the user during the login request made by the user device 110 to the network server 120, and in response, the authentication server 130 may select an additional layer of security to network server 120 based on information about the user. In one example, the authentication server 130 may analyze the user information and may select one or more appropriate interactive games for the user to complete before the user authentication is approved and verified. The game play results of the user can be compared to expected game play results (e.g., expected game play results for the same user and/or for other similar users) to verify authentication and to determine whether to grant access to the user account. For example, the authentication server 130 may determine whether the game play results of the user are played as "successfully" or as "poorly" as the user is expected to have played (given previous game play scenarios by the user or other game play scenarios by similar users). Thus, a malicious third party would have to engage the interactive game as successfully and/or as poorly as the user would during an authentic login attempt in order to gain access. In one example, the interactive game may be presented to the user on the website on which the user is attempting to login via the user device 110, and the user may engage with the interactive game via the user device 110.

Figure 2:
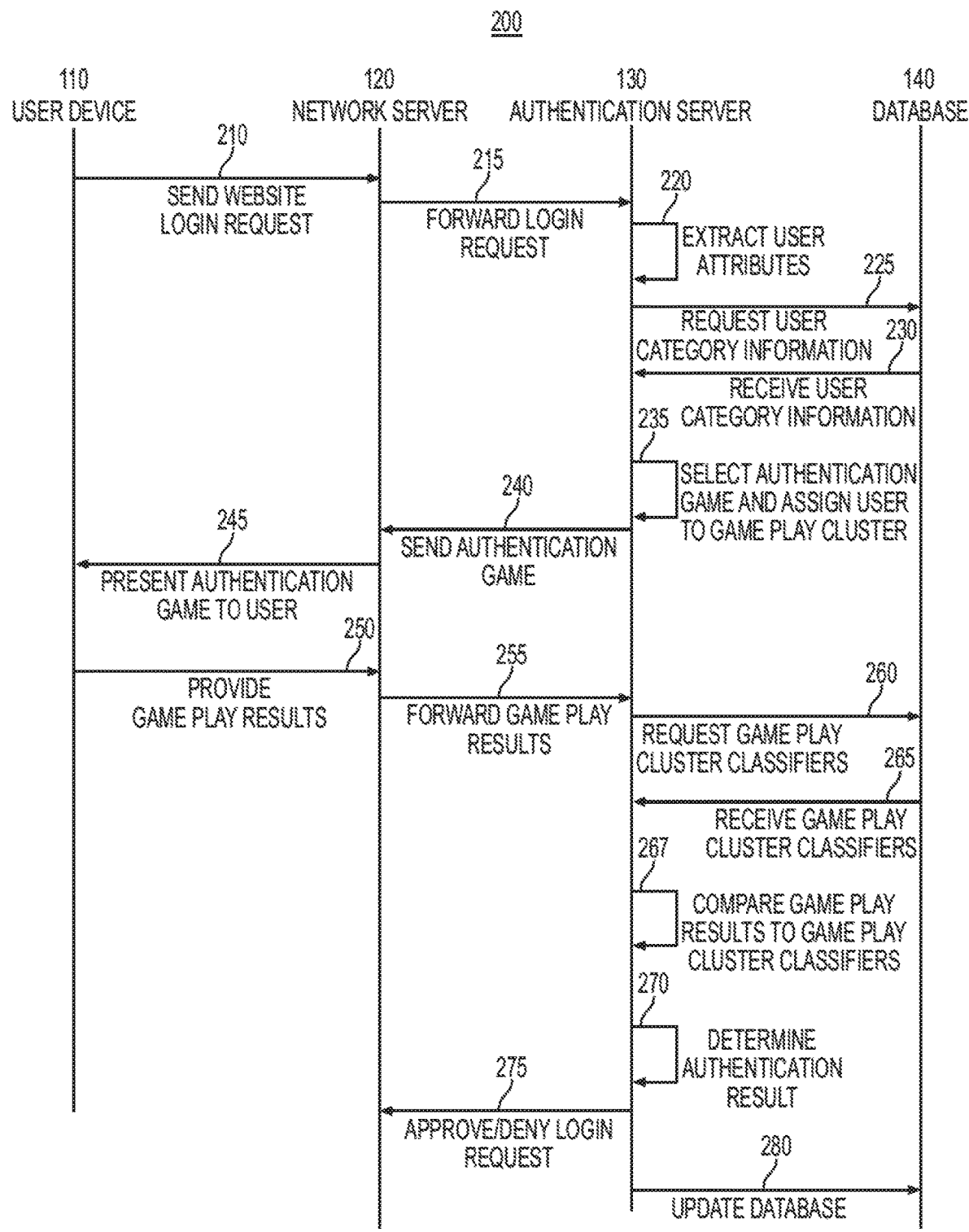
FIG. 2 depicts a data flow diagram showing communications between a user device, a network server, an authentication server, and a database, according to one or more embodiments.

Reference is now made to FIG. 2. FIG. 2 shows an example data flow diagram 200 depicting data messages exchanged between the user device 110, the network server 120, the authentication server 130, and the database 140. In one example, the data messages exchanged in FIG. 2 represent a system for verifying user authentication, according to the techniques herein. At step 210, the user device 110 may send a website login request to the network server 120. The login request may be initiated by a user (not shown in FIG. 2) who is operating the user device 110. The login request may be a request for access to secure information (e.g., a user's financial account) hosted by the network server 120 or otherwise accessible by the network server 120. In order to add additional security to the login request and to verify that the login request is authentic and appropriate, the network device 120 may communicate with the authentication server 130 to receive additional security authentication for the login request. For example, the network device 120 may determine that the user login attempt indicates a suspicious login attempt (e.g., by assessing suspicious user device 110 such as a flagged IP address, a previously flagged user, a number of unsuccessful login attempts exceeding a predetermined number in a predetermined period of time, etc.). In some embodiments, the network device 120 may communicate with the authentication server 130 regardless of the user login indicating a suspicious login attempt. At step 215, the network server 120 may forward the login request to the authentication server 130. The login request that the network server 120 forwards to the authentication server 130 may comprise information about the user. Such user information may include pre-processing information such as user demographic information, user location information, and/or information about the user device 110 (e.g., Internet Protocol (IP) address information, media access control (MAC) address information, etc.).

At step 220, the authentication server 130 may extract user attributes from the user information. Based on the extracted user attributes, the authentication server 130, at step 225, may request user category information from the database 140, and receive, at step 230, the user category information from the database 140. The user category information may indicate a user group or cluster to which a user is assigned. In one example, the user may be assigned to a category based on the user's previous login attempts. For example, the authentication server 130 may assign the user to a user category by requesting from the database 140 user category information for the user from previous login attempts. In one example, the user category information may comprise game play results and performances from a previous authentication game played by the user during a previous login attempt for the website hosted by the network server 120.

The user category information may also comprise information of other users in a similar category as the user. For example, the user category information may include information of users with a similar demographic profile or location as the user. The user category information may include expected game play results for a variety of authentication games based on the performance of other users in a similar category of the user. For example, when the authentication server 130 requests at 225 the user category information, the database 140 may return to the authentication server 130 expected game play results for users who are similar to the user making the login request.

At step 235, the authentication server 130 may select an authentication game to be sent to the network server 120 for interaction with the user via the user device 110. The authentication server 130 may also assign the user to a game play cluster associated with the selected authentication game. The authentication game may be selected based on a variety of criteria. For example, the authentication game may be selected based on the user's demographic information (e.g., age, gender, education, income level, Internet Protocol (IP) address, device type, browser type, language, keyboard layout, screen size, marital status, occupation, etc.) or other user information. The authentication game may also be selected based on the available user category information. The authentication game may be an authentication game previously sent to the user during a previous login attempt by the user. In one example, the authentication server 130 may select an authentication game for which it has the most voluminous or most accurate expected game play result data (e.g., from the user category information). In one example, the authentication game may be a game that the user can engage and interact with via the user device 110, and the authentication game may be limited in duration, during which time game play results of the user may be measured. For example, the user may play the game between three seconds and 120 seconds, and the game play metrics and data may be collected during this time.

At step 240, the authentication server 130 may send the authentication game to the network server 120. It should be appreciated that the authentication serer 130 may send the authentication game to the network server 120 when the authentication server determines that the login request it received (e.g., at reference numeral 215) is a potential fraudulent login attempt. That is, the login attempt may provide an indication to the network server 120 of potentially fraudulent activity, thus triggering the network server 130 to forward the login request to the authentication server 130 (as shown in 215) for additional security layers. In one example, the network server 120 may forward the login request to the authentication server 130 for all user login attempts. After the authentication server 130 sends the authentication game to the network server 120, the network server 120 may present the authentication game to the user via the user device 110, as shown at step 245. For example, the network server 120 may provide a link or forwarding address to the user device 110 that, upon interaction with the link or forwarding address, causes the user device 110 to display the authentication game. In another example, the network server 120 may provide the authentication game itself to the user device 110 via, for example, an application program interface (API).

The user may engage the user device 110 to play the authentication game. The network server 120 may store data representing the user's game play (e.g., the user's interaction with the authentication game via the user device 110). For example, the network server 120 may store data including game play results that occur while the game is played (e.g., how the user maneuvers during the game), and game play results after game play is completed. Thus, the user device 110 may send, at step 250, game play results to the network server 120 (including both in-game game play results and post-game game play results). The network server 120 may forward the game play results to the authentication server 130, as shown at step 255. In one example, the authentication server 130 serves the game to the user, and the user plays the game. The authentication server 130 uses the authentication logic 160 to compare the game play results with results stored in the database 140.

Upon receiving the game play results from the network server 120, the authentication server 130, at step 260, may request from the database 140, game play cluster classifier information. The game play cluster classifier information (e.g., "game play cluster classifiers") may represent information about expected game play results for corresponding authentication games. For example, for the authentication game that is sent to the network server 120 at step 240, the database 140 may store game play cluster classifiers corresponding to expected game play results for the authentication game. The game play cluster information may include expected game play results for a variety of authentication games for the user category to which the user was assigned. For example, the expected game play results may include quickness of play, accuracy of play, length of play, reaction times and speeds during game play, movements, movement dynamics for how a user plays a game (e.g., playing in an up direction first, followed by a down direction versus playing in a down direction and a right direction), etc. The expected game play results may represent, for example, previous game performances by the user during earlier login attempts when presented with the authentication game. The expected game play results may also represent, for example, game performances by other users in the user category for the authentication game. In another example, the expected game play results may represent predicted game play results based on the user information and the assigned user category.

For example, a first classifier may correspond to expected game play movements, a second classifier may correspond to expected game play speeds, and so on for various game play measurements. The game play cluster classifiers may correspond to the user category to which the user is assigned in steps 225 and 230. For example, the user may be assigned into a first user category, and at step 260, the authentication server 130 may request from the database 140 game play cluster classifiers that are associated with the first user category. Thus, the game play cluster classifiers may vary from authentication game to authentication game, and may vary from user category to user category.

At step 265, the authentication server 130 may receive from the database 140 the game play cluster classifiers, and at step 267, the authentication server 130 may compare the game play results with the game play cluster classifiers. At 270, the authentication server 130 may determine an authentication result. The authentication server 130 may determines the authentication result, for example, by comparing the data representing the game play results (e.g., received from the network server 120 at step 255) to the expected game play results represented by the game play cluster classifiers received at step 265. At step 275, the authentication server 130 may send an approval or a denial for the user login request to the network server 120. For example, when the game play results match the expected game play results, the authentication server 130 may send an approval to the network server 120 for the user login request. On the other hand, when the game play results do not match the expected game play results, the authentication server 130 may send a denial of the user login request to the network server 120. In one example, when the authentication server 130 sends a denial of the user login request to the network server 120, the authentication server 130 may further flag the user's account or the user device 110 as a suspicious account or a suspicious user device, and may store this indication in the database 140.

At step 280, the authentication server 130 may update the database 140 to include the game play results performed by the user (e.g., the game play results received by the authentication server 130 at step 255). For example, the authentication server 130 may reclassify the user to a different game play cluster based on the game play results. In one example, the user may increase or decrease a game performance metric, but his or her login may otherwise be verified, and the authentication server 120 may update the database 140 and store an indication to modify the game play cluster for the user category to which the user was assigned. The authentication server 130 may also store in the database 140 data about the user (e.g., if the user information is new to the authentication server 130), may store data about the user device 110, and may store data about the authentication result (e.g., if the login was approved or denied).

Figure 3:
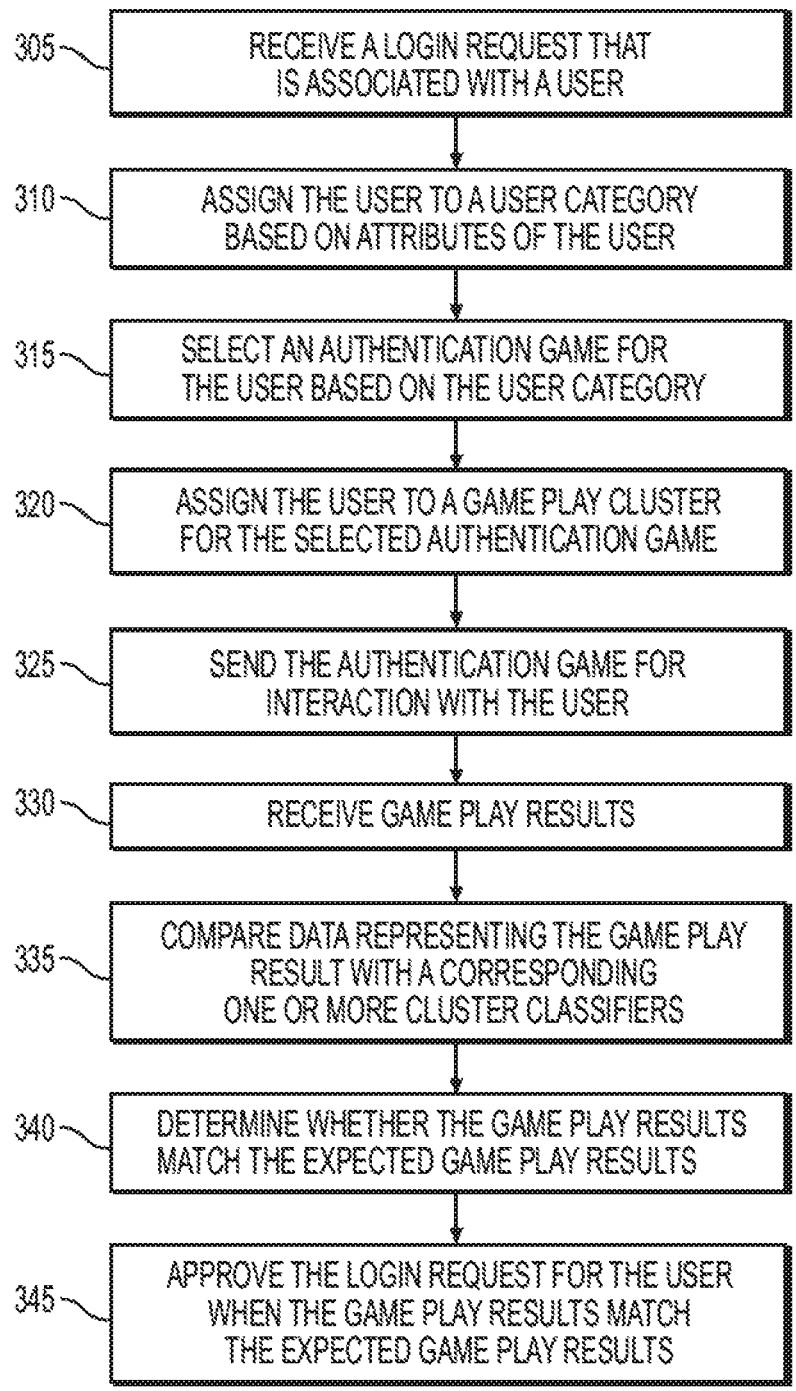
FIG. 3 depicts a flowchart of example method of verifying user authentication, according to one or more embodiments.

FIG. 3 depicts a flowchart 300 of an example method of the authentication server 130 verifying user authentication. The operations in flowchart 300 may be performed by a processor of the authentication server 130 at the direction of the authentication logic 160. At operation 305, the authentication server 130 may receive a login request associated with a user. The authentication server 130 may assign the user to a user category, at operation 310, based on attributes of the user. At operation 315, the authentication server 130 may select an authentication game for the user based on the user category, and at operation 320, may assign the user to a game play cluster for the selected authentication game. At operation 325, the authentication server 130 may send the authentication game to the user for interaction with the user. The authentication server 130 may receive game play results at operation 330, and at operation 335, may compare data representing the game play results with a corresponding one or more cluster classifiers. At operation 340, the authentication server 130 may determine whether the game play results match the expected game play results, and at operation 345, the authentication server 130 may approve the login request for the user when the game play results match the expected game play results.

Figure 4:
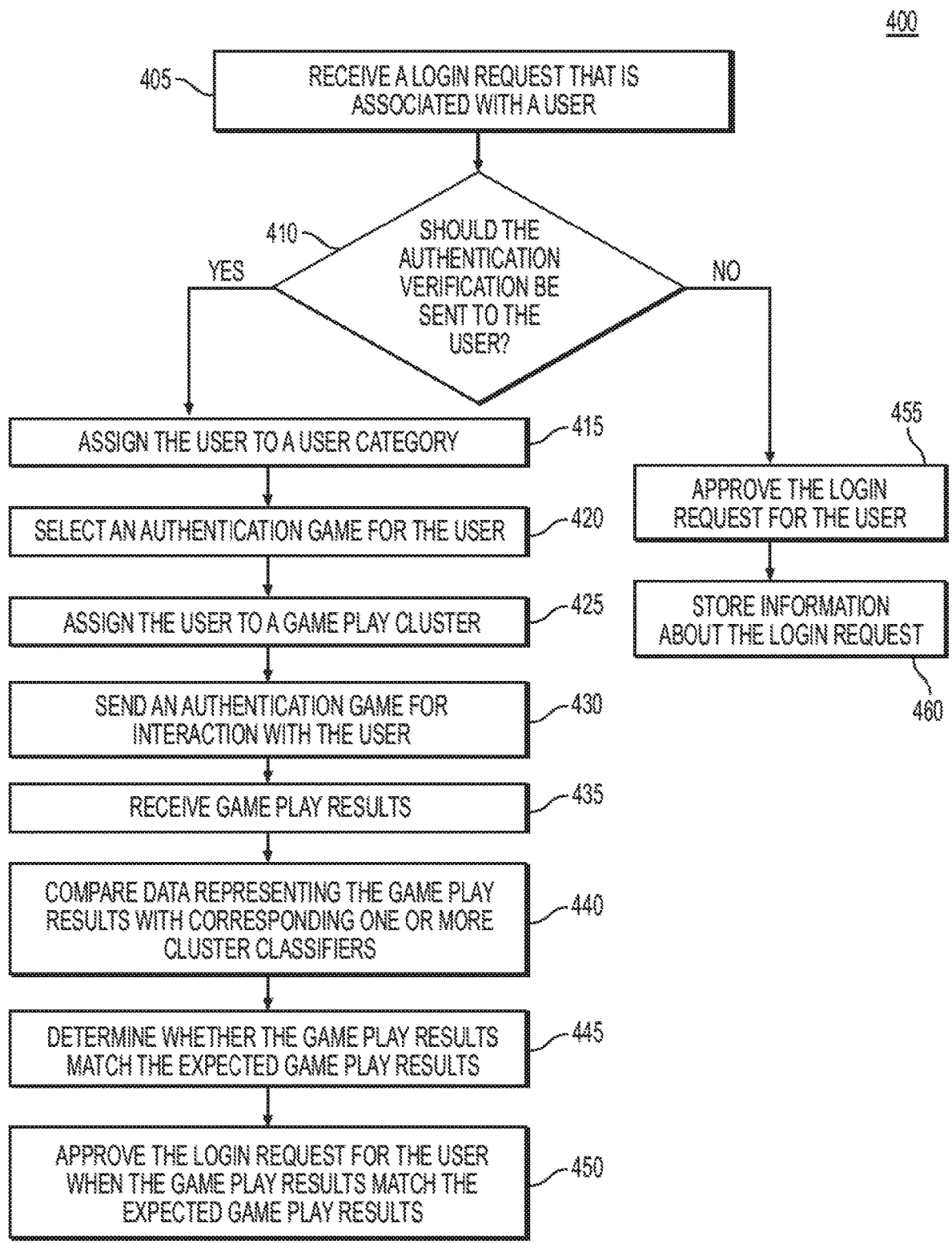
FIG. 4 depicts a flow chart of another example method of verifying user authentication, according to one or more embodiments.

FIG. 4 shows a flow chart 400 representing another example method for the authentication server 130 verifying user authentication. The operations in flowchart 400 may be performed by a processor of the authentication server 130 at the direction of the authentication logic 160. At operation 405, the authentication server 130 may receive a login request that is associated with a user. At operation 410, the authentication server 130 may make a determination of whether an authentication verification should be sent to the user. As stated above, the authentication server 130 may make this determination based on attributes of the user device 110 from which the login request originated indicating a suspicious login attempt. The authentication server 130 may also make this determination based on previous login attempts by the user exceeding a predetermined number (e.g., indicating a potential brute force access attempt). There may be other examples of how the authentication server 130 determines whether the authentication verification should be sent.

When the authentication server 130 determines that the authentication verification should be sent to the user (e.g., operation 410: Yes), the authentication server 130, at operation 415, may assign the user to a user category, and at operation 420, select an authentication game for the user. At operation 425, the authentication server 130 may assign the user to a game play cluster, and at operation 430 send the authentication game for interaction with the user. The authentication server 130 may receive game play results at operation 435, and compare data representing the game play results with a corresponding one or more cluster classifiers at operation 440. At operation 445, the authentication server 130 may determine whether the game play results match the expected game play results, and at operation 450, the authentication server 130 may approve the login request for the user when the game play results match the expected game play results.

When the authentication server 130 determines that authentication verification should not be sent to the user (e.g., operation 410: NO), the authentication server 130 may approve the login request for the user at operation 455, and at operation 460 may store information about the login request (e.g., in database 140).

In general, any process discussed in this disclosure that is understood to be computer-implementable, such as the processes illustrated in FIGS. 2-4, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as the network server 120, the authentication server 130, and/or user device 110, may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 5:
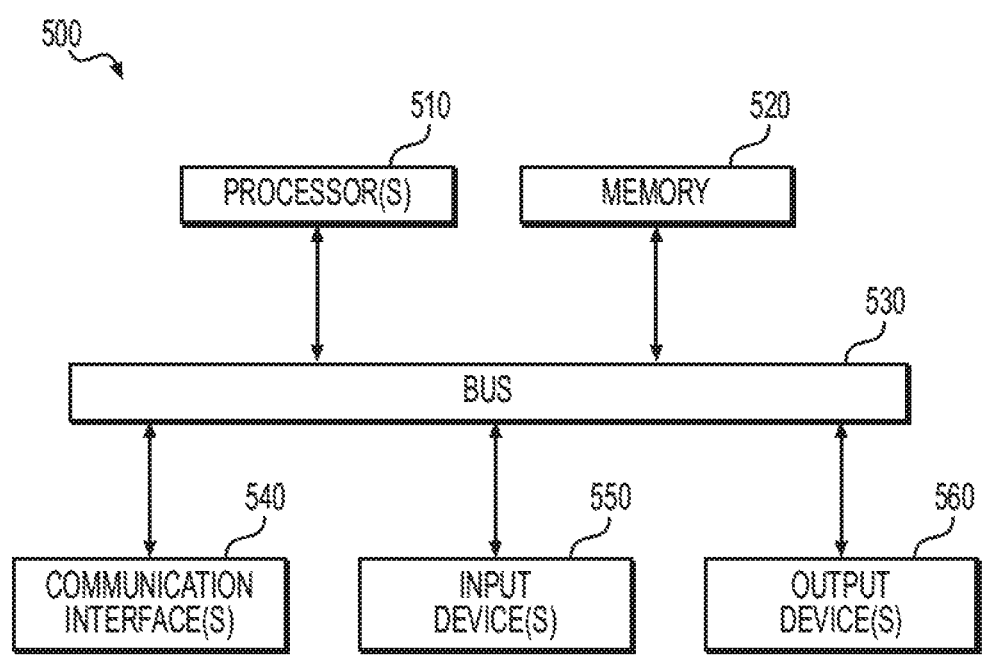
FIG. 5 shows an example block diagram of a computing device configured to execute various techniques and methods described herein, according to one or more embodiments.

FIG. 5 illustrates an example block diagram of a computer system/computing device 500 (e.g., the authentication server 130). The computing device 500 may include processor(s) 510 (e.g., CPU, GPU, or other such processing unit(s)), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code such as the authentication logic 160) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, printer). The aforementioned elements of the computing device 500 may be connected to one another through a bus 530, which represents one or more busses. In some embodiments, the processor(s) 510 of the computing device 500 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A method for verifying user authentication, the method comprising:

at an authentication server device configured to communicate with a network server device over a network, receiving from the network server device a login request that is associated with a user;
assigning the user to a user category based on attributes of the user;
selecting an authentication game for the user based on the user category;
assigning the user to a game play cluster for the selected authentication game, wherein the cluster has one or more cluster classifiers that each represent expected game play results for the authentication game;
sending the authentication game to the network server device over the network for interaction with the user;
receiving a game result from the network server device, wherein the game result includes data representing game play results from the interaction of the user with the authentication game;
comparing the data representing the game play results with a corresponding one or more of the cluster classifiers;
based on the comparing, determining whether the game play results match the expected game play results; and
when the determining indicates that the game play results match the expected game play results, approving the login request for the user.

2. The method of claim 1, wherein assigning the user to the user category comprises predicting the user to the user category based on pre-processing information.

3. The method of claim 2, wherein the pre-processing information comprises demographic information of the user.

4. The method of claim 1, further comprising:
based on the login request that is associated with the user, determining whether the login request indicates a potential fraudulent login attempt; and
upon determining that the login request indicates the potential fraudulent login attempt, sending the authentication game to the network server device over the network for interaction with the user.

5. The method of claim 1, wherein the cluster classifiers are classifiers representing previous game performances by the user.

6. The method of claim 1, further comprising when the determining indicates that the game play results do not match the expected game play results, denying the login request for the user.

7. The method of claim 6, further comprising upon denying the login request, flagging an account associated with the user or the network device as a suspicious account.

8. The method of claim 1, further comprising storing an indication to change the cluster based on the game play results.

9. The method of claim 1, wherein selecting the authentication game comprises selecting a game previously sent to the user.

10. The method of claim 1, wherein the game clusters are clusters of classifiers of other users in the same user category as the user.

11. The method of claim 1, wherein data representing game play results includes one or more of game play speed, accuracy, and reaction time.

12. A method for verifying user authentication, the method comprising:
at an authentication server device configured to communicate with a network server device over a network, receiving from the network server device a login request that is associated with a user;
determining whether an authentication verification should be sent to the user based on previous login attempts by the user;
when the determining does not indicate that the authentication verification should be sent to the user:
approving the login request for the user; and
storing, in a database, information about the login request; and
when the determining indicates that the authentication verification should be sent to the user:
assigning the user to a user category based on attributes of the user;
selecting an authentication game for the user based on the user category;
assigning the user to a game play cluster for the selected authentication game, wherein the cluster has one or more cluster classifiers that each represent expected game play results for the authentication game;
sending the authentication game to the network server device over the network for interaction with the user;
receiving a game result from the network server device, wherein the game result includes data representing game play results from the interaction of the user with the authentication game;
comparing the data representing the game play results with a corresponding one or more of the cluster classifiers;
based on the comparing, determining whether the game play results match the expected game play results; and
when the determining indicates that the game play results match the expected game play results, approving the login request for the user.

13. The method of claim 12, wherein determining whether the authentication verification should be sent to the user comprises determining that the authentication verification should be sent to the user based on previous login attempts by the user exceeding a predetermined number.

14. The method of claim 12, wherein determining whether the authentication verification should be sent to the user comprises determining that the authentication verification should be sent to the user based on device attributes from which the login request originated indicating a suspicious login attempt.

15. The method of claim 12, wherein assigning the user to the user category comprises predicting the user to the user category based on pre-processing information.

16. The method of claim 15, wherein the pre-processing information comprises demographic information of the user.

17. The method of claim 12, wherein the cluster classifiers are classifiers representing previous game performances by the user.

18. The method of claim 12, further comprising when the determining indicates that the game play results do not match the expected game play results, denying the login request for the user.

19. The method of claim 18, wherein the game play cluster is a cluster of classifiers of other users in the same user category as the user.

20. A system for verifying user authentication, the system comprising:
a first memory storing a database configured to store user data; and
an authentication server in communication with the database and with a network server device over a network, and the authentication server including a second memory storing instructions and a processor executing the instructions to perform operations, the operations including:

receiving from the network server device a login request that is associated with a user;

assigning the user to a user category based on attributes of the user received from the database;

selecting an authentication game for the user based on the user category;

assigning the user to a game play cluster for the selected authentication game, wherein the cluster has one or more cluster classifiers that each represent expected game play results for the authentication game;

sending the authentication game to the network server device over the network for interaction with the user;

receiving a game result from the network server device, wherein the game result includes data representing game play results from the interaction of the user with the authentication game;

comparing the data representing the game play results with a corresponding one or more of the cluster classifiers;

based on the comparing, determining whether the game play results match the expected game play results; and upon determining that the game play results match the expected game play results, approving the login request for the user.

* * * * *